(12) United States Patent
Ding et al.

(10) Patent No.: US 7,467,027 B2
(45) Date of Patent: Dec. 16, 2008

(54) COMPENSATION FOR THERMAL SIPHONING IN MASS FLOW CONTROLLERS

(75) Inventors: Junhua Ding, Tewksbury, MA (US); Michael L'Bassi, Sterling, MA (US); Kaveh H. Zarkar, Andover, MA (US)

(73) Assignee: MKS Instruments, Inc., Andover, MA (US)

( * ) Notice: Subject to any disclaimer, the term of this patent is extended or adjusted under 35 U.S.C. 154(b) by 145 days.

(21) Appl. No.: 11/340,260

(22) Filed: Jan. 26, 2006

(65) Prior Publication Data

US 2007/0174016 A1 Jul. 26, 2007

(51) Int. Cl.
*F17D 3/00* (2006.01)
*G05D 7/00* (2006.01)

(52) U.S. Cl. .......................... 700/282; 702/45; 702/50; 702/100; 73/202

(58) Field of Classification Search .................. 700/282; 702/45, 47, 50, 100; 73/202, 202.5
See application file for complete search history.

(56) References Cited

U.S. PATENT DOCUMENTS

| | | | |
|---|---|---|---|
| 3,938,384 A | 2/1976 | Blair | |
| 4,056,975 A | 11/1977 | LeMay | |
| 4,100,801 A | 7/1978 | LeMay | |
| 5,062,446 A | 11/1991 | Anderson | |
| 5,191,793 A | 3/1993 | Drexel et al. | |
| 5,279,154 A | 1/1994 | Vavra et al. | |
| 5,763,774 A * | 6/1998 | Ha et al. ....................... 73/202 | |
| 6,044,701 A | 4/2000 | Doyle et al. | |
| 6,564,824 B2 * | 5/2003 | Lowery et al. ............ 137/487.5 |
| 6,564,825 B2 * | 5/2003 | Lowery et al. ............ 137/487.5 |
| 6,810,308 B2 * | 10/2004 | Shajii et al. .................. 700/282 |
| 6,839,643 B2 * | 1/2005 | Kanke et al. .................... 702/45 |
| 6,868,862 B2 * | 3/2005 | Shajii et al. ............ 137/487.5 |
| 6,962,164 B2 * | 11/2005 | Lull et al. ....................... 137/2 |
| 7,000,465 B1 | 2/2006 | L'Bassi et al. | |
| 7,004,191 B2 * | 2/2006 | Shajii et al. .............. 137/487.5 |
| 7,222,029 B2 * | 5/2007 | Larson ......................... 702/45 |
| 2003/0234048 A1 | 12/2003 | Shajii et al. | |
| 2006/0009926 A1 | 1/2006 | Larson | |

FOREIGN PATENT DOCUMENTS

WO  WO 02/086632 A2  10/2002

OTHER PUBLICATIONS

PCT International Search Report for related PCT Application No. PCT/US2006/041153 (4 pages).
PCT Written Opinion of the International Searching Authority for related PCT Application No. PCT/US2006/041153 (6 pages).

* cited by examiner

*Primary Examiner*—Albert Decady
*Assistant Examiner*—Douglas S Lee

(57) ABSTRACT

A thermal mass flow controller for controlling flow rate of a fluid includes a conduit configured to receive the fluid, a pressure sensor that measures the pressure of the fluid as the fluid flows within the conduit, a temperature sensor that measures the ambient temperature of the fluid, and a thermal sensor that generates an output representative of the flow rate of the fluid. The thermal mass flow controller further includes a control system configured to monitor the output from the thermal sensor, the pressure measured by the pressure sensor, and the ambient temperature measured by the temperature sensor, to regulate flow of the fluid within the conduit so as to compensate for a shift in the thermal sensor output caused by thermal siphoning.

16 Claims, 4 Drawing Sheets

COMPENSATION FOR THERMAL SIPHONING IN MASS FLOW CONTROLLERS

BACKGROUND

Thermal siphoning in a mass flow controller (MFC) may refer to a continuous circulation of gas caused by the free convection between the heated thermal flow sensor and the bypass. Thermal siphoning may result in a non-zero output signal for the flow rate that resembles zero point drift, even when the actual output flow rate is zero. In some MFC designs, thermal siphoning effects may be more likely to occur if the mass flow controller is installed vertically, and may vary in proportion with the molecular weight and pressure of the fluid whose flow rate is being controlled.

In addition to causing the zero point calibration in mass flow controllers to shift, thermal siphoning may also cause a calibration shift in the span or dynamic range of the mass flow meter of the mass flow controller.

A method and system are needed that can reduce, or compensate for, thermal siphoning effects in a thermal mass flow controller.

SUMMARY

A thermal mass flow controller for controlling flow rate of a fluid includes a conduit configured to receive the fluid, a pressure sensor configured to measure pressure of the fluid as the fluid flows within the conduit, and a temperature sensor configured to measure ambient temperature of the fluid. The thermal mass flow controller further includes a thermal sensor configured to generate an output representative of the flow rate of the fluid. The thermal mass flow controller further includes a control system configured to monitor the output from the thermal sensor, the pressure measured by the pressure sensor, and the ambient temperature measured by the temperature sensor, to regulate flow of the fluid within the conduit so as to compensate for a shift in the thermal sensor output caused by thermal siphoning.

A method of compensating for thermal siphoning in a thermal mass flow controller is described. The thermal mass flow controller includes a conduit configured to allow flow of the fluid between an inlet and an outlet of the conduit, and a thermal sensor configured to generate an output representative of the flow rate of the fluid. The method includes monitoring measurements of a pressure of the fluid and an ambient temperature of the fluid, detecting a shift in the output of the thermal sensor caused by thermal siphoning, and regulating flow of the fluid into the inlet of the conduit and out of the outlet of the conduit, so as to compensate for the detected shift.

DETAILED DESCRIPTION

A system and method are described for substantially reducing, or compensating for, thermal siphoning in a thermal mass flow controller.

Figure 1A:
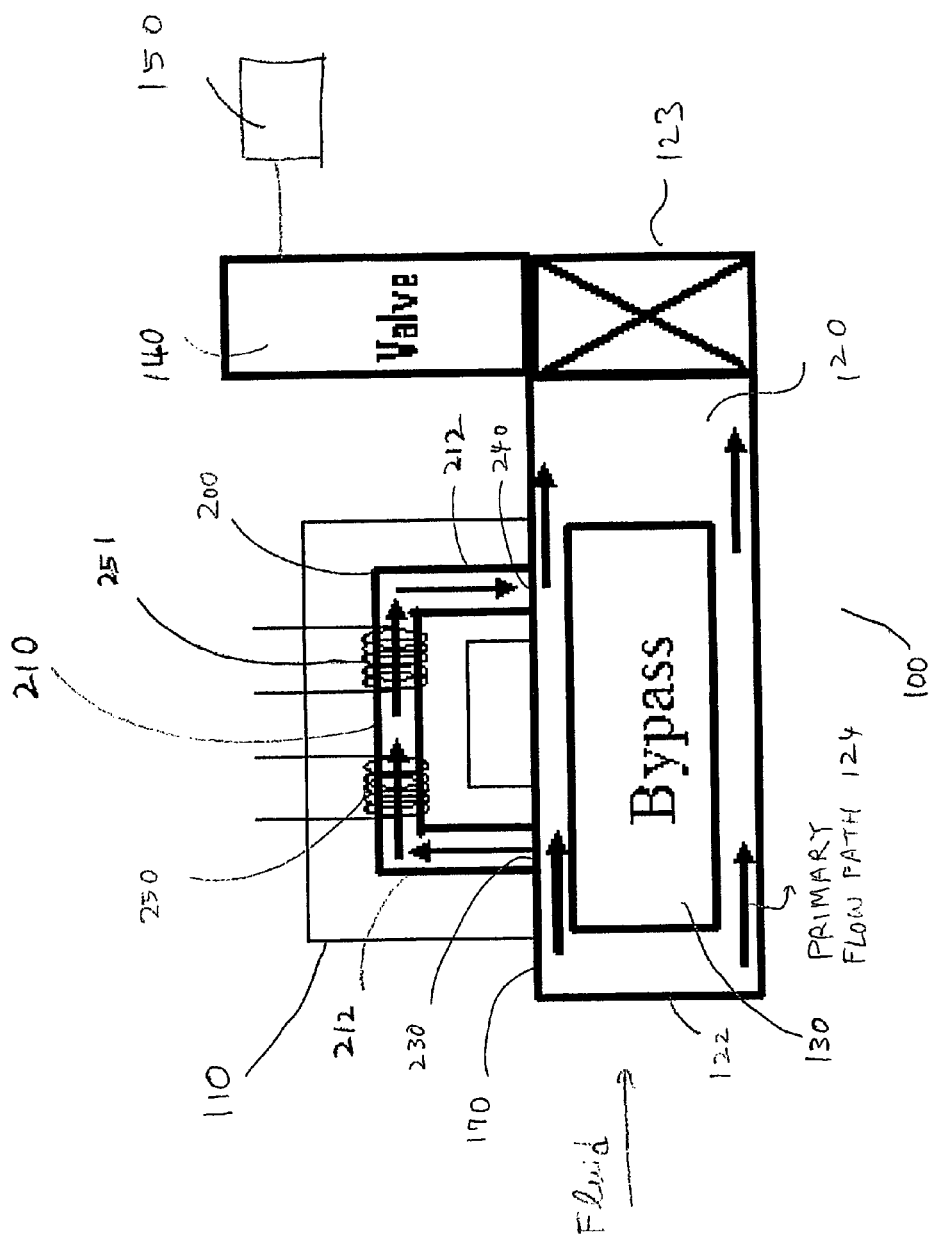
FIGS. 1A and 1B schematically illustrates the operation of a thermal mass flow controller, and the phenomenon of thermal siphoning.
Figure 1B:
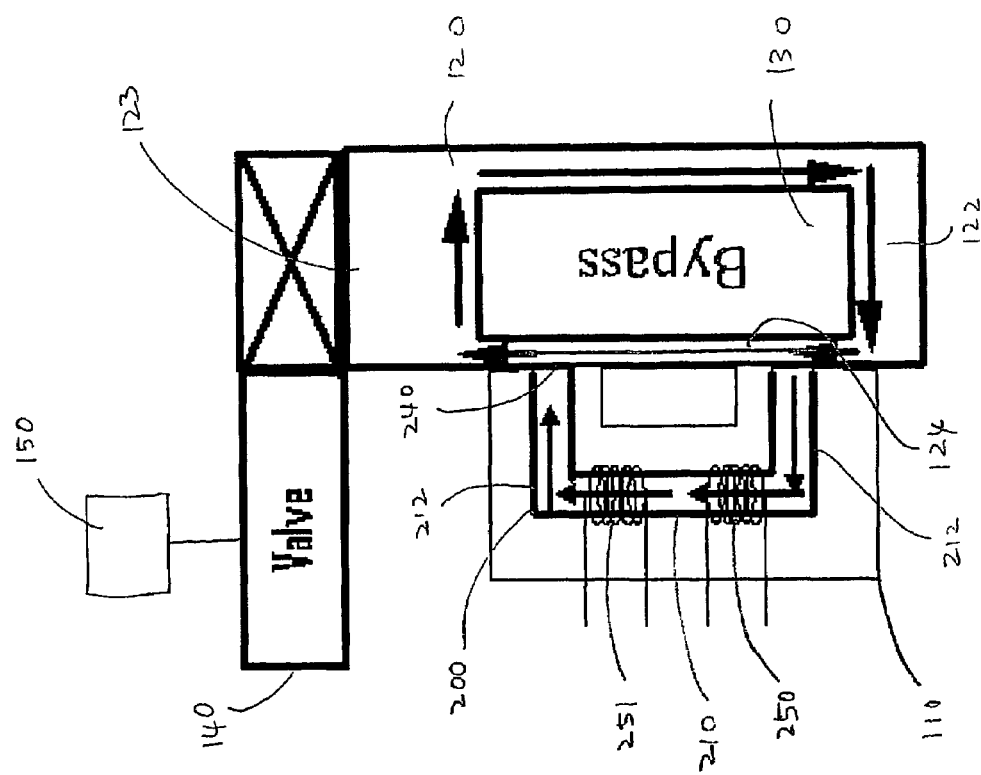

FIGS. 1A and 1B schematically illustrate the operation of a typical thermal MFC that measures and controls the mass flow rate of fluids, and also illustrate thermal siphoning that may occur when the MFC is mounted vertically, as shown in FIG. 1B. FIG. 1A illustrates a horizontally mounted thermal MFC, while FIG. 1B illustrates a thermal MFC that is the same as the MFC shown in FIG. 1A, but that is mounted vertically. In overview, thermal MFCs may measure the mass flow rate of a fluid by using the thermal properties of fluids and monitoring the temperature change of the heated sensor tube as the fluid flows therethrough. A thermal MFC may typically include a thermal mass flow meter which actually measures the mass flow rate of fluids, and a control assembly (including a valve and electronic control circuitry that controls the actuation of the valve), which regulates the flow rate of fluids so that the measured flow equals a desired flow setpoint. Typically, thermal MFCs may measure the mass flow rate of gases and vapors, although flow rates of fluids other than gases and vapors may also be measured.

Referring to FIG. 1A, the thermal MFC 100 may include: a thermal mass flow sensor assembly 110; a conduit 120 or flow body configured to receive at an inlet 122 the fluid whose flow rate is being measured/controlled; and a bypass 130 within the conduit 120. The thermal MFC 100 may further include a valve 140, and a control system 150 that controls the operation of the valve 140 in a way that provides a controlled flow of the fluid from an outlet 123 of the conduit 120.

The conduit 120 or flow body may define a primary flow path or channel 124, and is bounded at least in part by a sensor receiving wall or sensor receiving surface 170. In the illustrated embodiment, the sensor receiving surface 170 is shown as being substantially parallel to the primary flow path 124. The majority of the fluid that is introduced to the MFC through the inlet 122 of the conduit 120 may proceed through the primary flow path 124. A relatively small amount of the fluid may be diverted through the thermal mass flow sensor assembly 110 by the bypass 130, and may re-enter the primary flow path 124 downstream of the bypass 130. The bypass 130 may be a pressure dropping bypass that provides a pressure drop across the primary flow channel 124 so as to drive a relatively small portion of the incoming fluid through the thermal mass flow assembly. The inlets and outlets of the sensor tube 200 may coincide with the inlets and outlet of the primary flow channel 124, and therefore the pressure drop across the bypass 130 may be the same as the pressure drop across the sensor tube 200.

The thermal mass flow sensor assembly 110 may be attached to the sensor receiving surface 170 that forms at least a portion of a boundary of the conduit 120. The thermal mass flow sensor assembly 110 may include: a thermal sensor 200 configured to allow the diverted portion of the incoming fluid to flow within the thermal sensor between an inlet 230 and an outlet 240 of the sensor 200; a sensor heater configured to heat the sensor tube; and a temperature measurement system configured to measure a temperature differential between two or more locations along the sensor. Typically, thermal sensor 200 may be a sensor tube. The sensor tube 200 may be a thin-walled, small-diameter capillary tube, and may be made of stainless steel, although different sizes, configurations, and materials may also be used for the sensor tube 200.

The sensor tube 200 may include a thermal sensing portion 210, which in FIG. 1A is shown as being disposed horizontally, parallel to the primary flow path, and two legs 212 which are shown in FIG. 1A as being vertical. A pair of resistive elements 250 and 251 may be disposed in thermal contact with the thermal sensing portion 210 of the tube 200 at different locations along the thermal sensing portion 210, and may function as both the sensor tube heater and as part of the temperature measurement system. As shown in FIG. 1A, the resistive elements 250 and 251 may be resistive coils that are wound around the tube 200 at two locations along the thermal sensing portion 210 of the tube, one upstream (250) and the other downstream (251). The sensor tube 200 may be heated by applying an electric current to the resistive elements, which may thus function as a heater for the tube.

As fluid introduced into the inlet of the sensor tube flows through the heated sensor tube, at a substantially constant rate, more heat may be transferred to the downstream resistive element 251, as compared to the upstream element 250. The upstream coil 250 may be cooled by fluid flow, giving up some of its heat to the fluid that flows by, and the downstream coil 251 may be heated, taking some of this heat that was given to the flowing fluid. As a result, a temperature differential $\Delta T$ may thus be created between the two elements, and may provide a measure of the number of fluid molecules (i.e. the mass of the fluid) flowing through the sensor tube. The change in the resistance of each of the resistive elements, caused by the temperature difference, may be measured in order to determine the temperature differential, resulting in an output signal from the mass flow meter as a function of the mass flow rate of the fluid. The output signal may be a voltage signal, although other types of signals may also be used for the thermal flow sensor output.

When the thermal sensor tube is mounted at certain orientations, and in particular the more the thermal sensing portion 210 sensor tube is oriented in a direction other than the horizontal direction, thermal siphoning may occur, caused by thermal gradients that appear inside the sensor tube as the sensor tube is heated. As explained below, thermal siphoning may occur in the vertically mounted MFC even when the control valve is completely closed as shown in FIG. 1B.

As the heat is transferred from the heated sensor tube surface to the gas, the temperature of the gas inside the heated sensor tube may increase, and the density of the gas may decrease. The cool, denser gas in the bypass area may be forced by gravity to fall. This in turn may force the hot, light gas in the heated sensor tube to rise. This phenomenon may be referred to as free convection. If the bypass area is cool enough, the hot gas rising from the heated sensor tube will cool and fall again. Thus a continuous circulation of gas inside the MFC, commonly referred to as thermal siphoning, will occur, even if the control valve is completely closed so that the output flow should be zero.

When the MFC is mounted horizontally, as shown in FIG. 1A, thermal siphoning may not be seen, because the free convective forces may sum to zero. The horizontal section 210 of the sensor tube may generate no convective force, and the convective forces generated by the two vertical legs 212 may cancel, so that the sum of the buoyancy forces may be zero.

When the MFC is rotated ninety degrees and mounted vertically, as shown in FIG. 1B, the sensor legs 212 may no longer generate any convective forces. However, the thermal sensing portion 210 containing the heater coils may now generate convective forces, because the thermal sensing portion 210 is now oriented vertically, not horizontally. Since the bypass is unheated, there may be no convective opposition, so that thermal siphoning may occur.

In general, thermal siphoning may cause a shift in the thermal sensor output signal. Thermal siphoning may cause a shift in zero, i.e. shift the null output to a non-zero signal. Thermal siphoning may also cause a shift in the span or dynamic range, i.e. in the flow rates covered by the relevant measuring range of the mass flow meter up to the maximum intended flow rate. As a result, the actual flow measurement may become a function of the inlet pressure and of the nature of the fluid. The thermal siphoning effects on zero and span (dynamic range) may increase with increasing inlet pressure and gas density.

Thermal siphoning may be governed by the Grashof number ($G_r$), which may typically be used to measure the severity of the thermal siphoning problem. The Grashof number is a ratio of buoyancy forces to viscous forces squared, and may generally represent the free convection heat transfer around the sensor tube.

Specifically, in one embodiment in which the fluid is a gas, the Grashof number $G_r$ (which is dimensionless) may be given by the following equation:

$$G_r = g\rho^2 \alpha (T-T_a) d^3 / \mu^3 \tag{1}$$

where
g=gravitational constant;
$\rho$=gas density;
$\alpha$=gas thermal coefficient of volumetric expansion;
T=gas temperature;
$T_a$=ambient temperature;
d=internal diameter of sensor tube; and
$\mu$=gas viscosity.

As seen from equation (1) above, the major factors that affect thermal siphoning may include gas density, and the sensor tube diameter. Although equation (1) shows that reducing the internal diameter of the sensor tube in the MFC may generally reduce the effects of thermal siphoning, manufacturing a tube having such a small diameter may be difficult and impractical, and may limit the dynamic range of the MFC design. The mounting attitude of the MFC has a substantial effect on thermal siphoning, the effect not being covered by the Grashof number.

Using the ideal gas law, the density $\rho$ is given by:

$$\rho = MP/RT, \tag{2}$$

where M is the gas molecular weight, P the gas pressure, and R the gas law constant. Substituting equation (2) into equation (1), we have:

$$G_r = g\alpha(T-T_a) d^3 M^2 P^2 / (\mu^3 R^2 T^2) \tag{3}$$

In Eq. (3), R, d, and g are constants; $\alpha$, $\mu$, and M are known for a given gas; the ambient temperature $T_a$ is measured by the temperature sensor; T is dependent on $T_a$, and the gas pressure P is measured by the pressure sensor. Thus, the Grashof number is determined.

The zero flow voltage signal $V_{ze}$ and the full range flow voltage signal $V_{fs}$ of the thermal flow sensor voltage can be determined by a mathematic model that uses the Grashof number and the MFC mounting attitude/position, as follows:

$$V_{ze} = f_{ze}(G_r, \text{Pos}) \tag{4}$$

$$V_{fs} = f_{fs}(G_r, \text{Pos}) \tag{5}$$

In equations (4) and (5), Pos is a flag that indicates the MFC mounting attitude or the orientation of the sensor tube. Equations (4) and (5) can be further generalized as:

$$V_{ze} = f_{ze}(P, T_a, \alpha, \mu, M, Pos) \quad (6)$$

$$V_{fs} = f_{fs}(P, T_a, \alpha, \mu, M, Pos) \quad (7)$$

In equations (6) and (7) above, P can be measured by a pressure sensor; $T_a$ can be measured by a temperature sensor; $\alpha$, $\mu$, M are gas properties; and Pos is a pre-determined factor. In other words, equations (6) and (7) indicate that $V_{ze}$ and $V_{fs}$ are known empirical functions of the measured pressure and the measured ambient temperature.

The thermal MFC may be calibrated at a predetermined fixed pressure $P_0$, fixed ambient temperature $T_{a0}$ and fixed position $Pos_0$. Thus, a calibration table of the thermal sensor voltage output versus the flow rate may be constructed as follows:

| Voltage | Flow Rate |
|---------|-----------|
| $V_{ze0}$ | 0 |
| . | . |
| . | . |
| . | . |
| V0 | Q0 |
| . | . |
| . | . |
| . | . |
| $V_{fs0}$ | $Q_{fs0}$ |

In the table above, a thermal sensor voltage of $V_0$ corresponds to a flow rate of $Q_0$, at the calibration pressure $P_0$, the calibration ambient temperature $T_{a0}$ and the calibration position $Pos_0$.

The calibration table may be saved in the control system, to be used for flow calculations at a later time. If the inlet pressure, the ambient temperature and the MFC mounting position do not change, the calibration table will not change, and can be used directly to determine the flow rate based on the thermal flow sensor voltage output. However, if the inlet pressure and/or the ambient temperature and/or the MFC mounting position change, the thermal flow sensor voltage output may shift because of thermal siphoning. If this happens, the calibration table may no longer be accurate or valid. Since it is known that $V_{ze}$ and the $V_{fs}$ change or shift according to Eq. (6) and Eq. (7), we can compensate for the shift in the thermal flow sensor voltage output caused by the thermal siphoning effect.

A simple linear compensation on thermal flow sensor voltage output may be formulated as follows:

1. Assume the inlet pressure is $P_1$, the ambient temperature is $T_1$, the new MFC mounting position is $Pos_1$ and the thermal flow sensor voltage output is $V_1$
2. Calculate the zero flow voltage as $V_{ze1}$ and the full scale flow voltage as $V_{fs1}$ according to Eq. (6) and Eq. (7)
3. Calculate a thermal siphoning compensated thermal sensor voltage output $V_1'$, using the following equations (8) or (9):

$$\frac{V_1 - V_{ze1}}{V_{fs1} - V_{ze1}} = \frac{V_1' - V_{ze0}}{V_{fs0} - V_{ze0}}, \quad (8)$$

that is $$V_1' = \frac{V_1 - V_{ze1}}{V_{fs1} - V_{ze1}}(V_{fs0} - V_{ze0}) + V_{ze0}. \quad (9)$$

4. Search the calibration table to find the corresponding flow rate based on the compensated thermal sensor voltage output $V_1'$.

The above compensation method is only one of many compensation methods, including both linear and nonlinear methods, that may be used to compensate for the thermal siphoning effect on the thermal flow sensor voltage output, based on Eq. (6) and Eq. (7). By using equations (1)-(9), and using the observation on the inlet pressure, the ambient temperature and MFC mounting position, the shift in thermal flow sensor voltage output caused by the thermal siphoning may be substantially reduced or compensated for. In particular, the thermal siphoning effect may be greatly reduced when a thermal MFC is mounted vertically, especially for large bore thermal mass flow sensors, by including in the MFC a pressure sensor and a temperature sensor that measure the pressure and the ambient/inlet temperature. The control system may be configured to monitor the pressure and temperature measurements so as to regulate flow of the fluid in such a way that the shift in the thermal flow sensor voltage output, caused by thermal siphoning, can be substantially reduced or compensated.

Figure 2A:
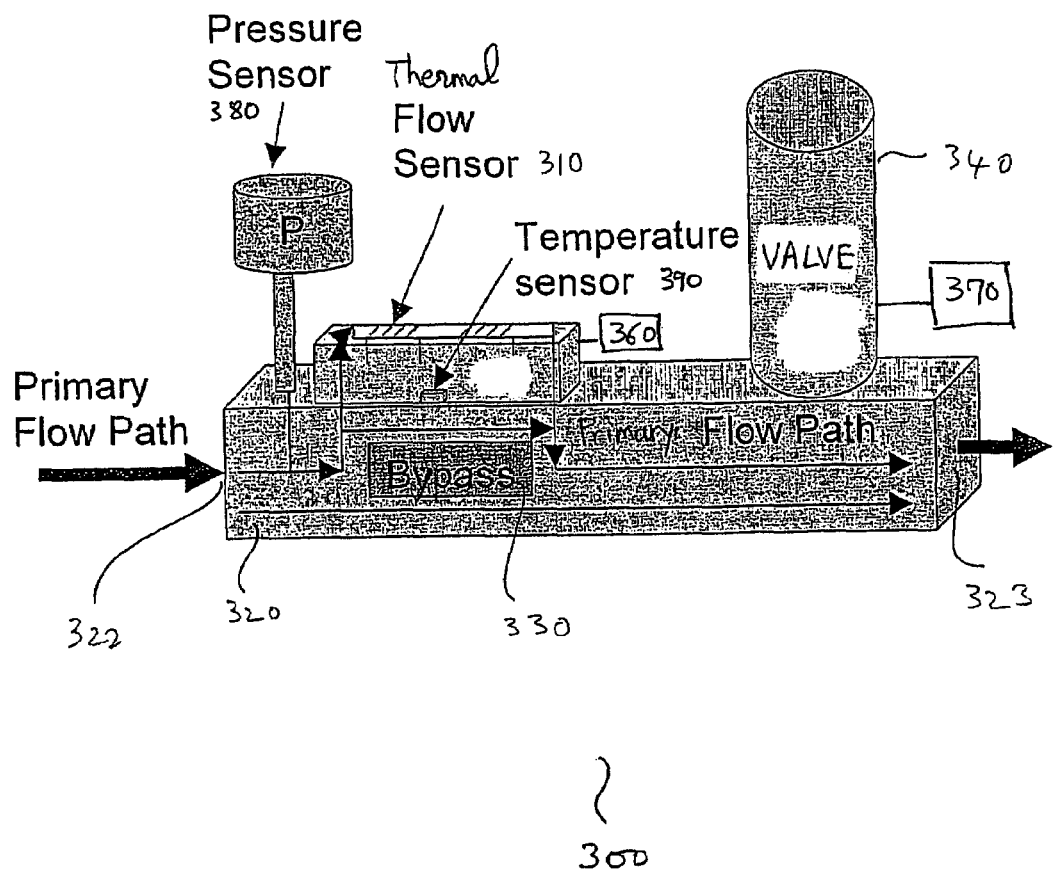
FIG. 2A illustrates a thermal MFC in which a pressure sensor and a temperature sensor is mounted on the thermal MFC to reduce the thermal siphoning effect. The pressure sensor is mounted upstream from the thermal flow sensor.

FIG. 2A illustrates a thermal MFC 300 that is designed to substantially reduce or compensate the shift in the thermal flow sensor output signal caused by thermal siphoning, by including a pressure sensor and a temperature sensor on the thermal MFC, and by monitoring the pressure and temperature measurements, to substantially reduce the thermal siphoning effect.

In overview, the thermal MFC 300 includes: a thermal mass flow sensor 310; a conduit 320 configured to receive at an inlet 322 the fluid whose flow rate is being measured/controlled, and having an outlet 323 from which the fluid flows out; and a bypass 330 within the conduit 320. The thermal MFC 300 further includes a valve 340, and a control system 370 that controls the operation of the valve 340 so as to regulate a flow of the fluid into the inlet 322 and out of an outlet 323 of the conduit 320. The thermal flow sensor tube may have a zero flow voltage signal $V_{ze}$ and a full scale voltage signal $V_{fs}$, which may be functions of the inlet fluid pressure, the inlet fluid temperature, and the orientation of the heated flow sensor tube.

The thermal MFC 300 further includes a temperature measurement system 360, a pressure sensor 380, and a temperature sensor 390. The temperature measurement system 360 is configured to measure the temperature differential between two or more locations along the heated flow sensor tube. The pressure sensor 380 is configured to measure the pressure P of the fluid, as the fluid flows along the primary flow path. The temperature sensor 390 is configured to measure the ambient temperature $T_a$ of the fluid. The thermal flow sensor may be configured to convert the measured temperature differential into a voltage output signal V, and may include a voltage detector configured to detect the voltage output signal.

In response to the flow rate measurement by the thermal flow sensor, the pressure measurement by the pressure sensor, and the temperature measurement by the temperature sensor, the control system 370 is configured to regulate flow of the fluid into the inlet and out of the outlet of the conduit 320 so that a detected shift in thermal flow sensor voltage output can be substantially eliminated or compensated for.

Figure 2B:
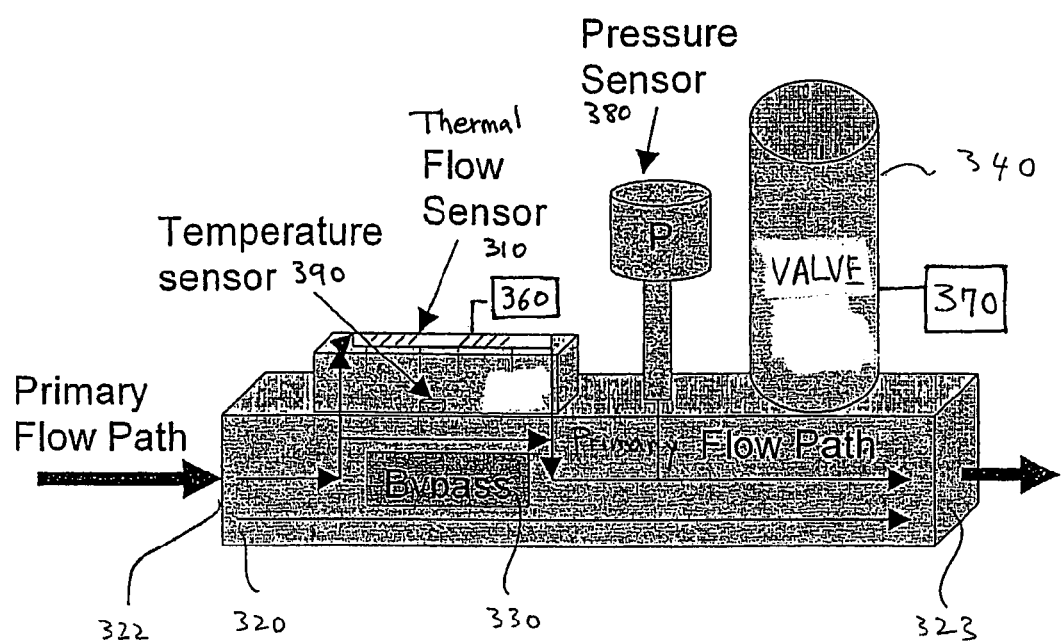
FIG. 2B illustrates a thermal MFC in which a pressure sensor and a temperature sensor is mounted on the thermal MFC to reduce the thermal siphoning effect. The pressure sensor is mounted downstream from the thermal flow sensor.

The pressure sensor 380 may be mounted either downstream or upstream from the thermal flow sensor 310. FIG. 2B illustrates a thermal MFC in which a pressure sensor 380 and a temperature sensor 390 are mounted on the thermal MFC, with the pressure sensor 380 located downstream from the thermal flow sensor 310.

In sum, a system and method have been described that significantly reduces the thermal siphoning effect in thermal mass flow controllers, by compensating for the shift in the thermal flow sensor output signal using the inlet pressure and the ambient temperature information.

While certain embodiments have been described of an apparatus and method that substantially eliminates thermal siphoning in an MFC, it is to be understood that the concepts implicit in these embodiments may be used in other embodiments as well. The protection of this application is limited solely to the claims that now follow.

In these claims, reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference, and are intended to be encompassed by the claims. Moreover, nothing disclosed herein is intended to be dedicated to the public, regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for".

What is claimed is:

1. A thermal mass flow controller for controlling flow rate of a fluid, the thermal mass flow controller comprising:
   a conduit configured to receive the fluid;
   a pressure sensor configured to measure pressure of the fluid, as the fluid flows within the conduit;
   a temperature sensor configured to measure ambient temperature of the fluid;
   a thermal sensor configured to generate an output representative of the flow rate of the fluid, the output comprising a voltage output; and
   a control system configured to monitor the output from the thermal sensor, the pressure measured by the pressure sensor, and the ambient temperature measured by the temperature sensor, to regulate flow of the fluid within the conduit so as to compensate for a shift in the thermal sensor output caused by thermal siphoning.
   wherein the thermal sensor, when heated, is configured to generate a temperature differential as the fluid flows within the heated sensor, and includes a temperature measurement system configured to measure the temperature differential, and a thermal sensor tube having a tubular configuration; and wherein the thermal sensor is configured to convert the measured temperature differential into the voltage output;
   wherein the control system is configured to calibrate the termal sensor with a zero flow voltage $V_{ze}$ that represents the voltage output at a zero fluid flow, and a full scale flow voltage $V_{fs}$ that represents the voltage output at a full scale fluid flow;
   wherein $V_{ze}$ and $V_{fs}$ are known empirical functions of the pressure measured by the pressure sensor and the temperature measured by the temperature sensor; and
   wherein $V_{ze}$ and $V_{fs}$ further comprise known empirical functions of a Grashof number $G_r$ that depends on the measured pressure and temperature; and
   wherein the Grashof number $G_r$ is given by:

$$G_r = g.\alpha.(T-T_a).d^3.M^2.P^2/(\mu^3.R^2.T^2),$$

where g is a gravitational constant;
   $\alpha$ is a thermal expansion coefficient of the fluid;
   $T_a$ is the temperature measured by the temperature sensor;
   T is a temperature of the fluid and depends on $T_a$;
   d is a diameter of the thermal sensor tube;
   M is a mass of the fluid;
   P is the pressure measured by the pressure sensor;
   $\mu$ is a viscosity of the fluid; and
   R is a universal gas law constant.

2. The thermal mass flow controller of claim 1,
   wherein $V_{ze}$ and $V_{fs}$ further depend on an orientation of the thermal sensor tube with respect to the primary flow path.

3. The thermal mass flow controller of claim 2,
   wherein the orientation of the thermal sensor tube is representable by a parameter Pos; and
   wherein $V_{ze}$ and $V_{fs}$ are representable by known empirical functions $f_{ze}(P, T_a, \alpha, \mu, M, Pos)$ and $f_{fs}(P, T_a, \alpha, \mu, M, Pos)$, respectively.

4. The thermal mass flow controller of claim 3,
   wherein the control system is further configured to calibrate the thermal sensor output at a calibration pressure $P_0$, a calibration ambient temperature $T_0$, and a calibration orientation $Pos_0$, by computing and storing a plurality of calibration values $V_{ze0}, \ldots V_0, \ldots V_{fs0}$ of the output voltage, at corresponding flow rates $0, \ldots, Q_0, \ldots,$ and $Q_{fs0}$; and
   wherein the control system is further configured to compensate for the shift in the thermal sensor output caused by thermal siphoning based on the plurality of stored calibration values.

5. The thermal mass flow controller of claim 4, wherein the control system is further configured to perform an interpolation to compensate for the shift caused by thermal siphoning.

6. The thermal mass flow controller of claim 5, wherein the interpolation comprises at least one of linear interpolation and non-linear interpolation.

7. The thermal mass flow controller of claim 4,
   wherein the control system is further configured to calculate a zero flow voltage $V_{ze1}$ and the full scale voltage $V_{fs1}$ using the known empirical functions $f_{ze}(P, T_a, \alpha, \mu, M, Pos)$ and $f_{fs}(P, T_a, \alpha, \mu, M, Pos)$, at measured values $P_1, T_1,$ and $V_1$ of the pressure, temperature, and output voltage respectively, to calculate a thermal sensor voltage output $V_{1'}$ that has been compensated for thermal siphoning; and
   wherein the control system is further configured to determined a flow rate for which thermal siphoning has been compensated for, by searching the plurality of stored calibration values to find a corresponding flow rate based on the calculated $V_{1'}$.

8. The thermal mass flow controller of claim 7,
   wherein the control system is configured to compensate for the shift caused by thermal siphoning by performing linear interpolation; and
   wherein the control system is configured to calculate $V_{1'}$ in terms of $V_{ze1}, V_{fs1}$, using the following equation:

$$V'_1 = \frac{V_1 - V_{ze1}}{V_{fs1} - V_{ze1}}(V_{fs0} - V_{ze0}) + V_{ze0}.$$

9. The thermal mass flow controller of claim 1, wherein the pressure sensor is located upstream, compared to the temperature sensor.

10. The thermal mass flow controller of claim 1, wherein the pressure sensor is located downstream, compared to the temperature sensor.

11. The thermal mass flow controller of claim 1, further comprising a bypass within the conduit, the bypass configured to restrict a flow of fluid entering the inlet of the conduit so as divert a portion of the fluid onto an input end of the thermal sensor.

12. The thermal mass flow controller of claim 11, wherein the bypass comprises a pressure dropping bypass configured to generate a pressure differential across the thermal sensor.

13. The thermal mass flow controller of claim 1, wherein the temperature measurement system comprises:
 a pair of thermally sensitive resistive elements, each of the elements having a resistance that varies as a function of temperature of the element; and
 a measuring circuit configured to determine the temperature of each of the elements by measuring the resistance of each element.

14. The thermal mass flow controller of claim 1, further comprising a heater configured to heat at least a portion of the thermal sensor.

15. The thermal mass flow controller of claim 14, wherein the heater comprises a pair of heating coils configured to resistively heat a thermal sensing portion of the sensor when an electric current is supplied thereto.

16. A method of compensating for thermal siphoning in a thermal mass flow controller for controlling flow rate of a fluid, the thermal mass flow controller including a conduit configured to allow flow of the fluid between an inlet and an outlet of the conduit, and a thermal sensor configured to generate an output representative of the flow rate of the fluid, the method comprising:
 monitoring measurements of a pressure of the fluid and an ambient temperature of the fluid;
 detecting a shift in the output of the thermal sensor caused by thermal siphoning; and
 regulating flow of the fluid into the inlet of the conduit and out of the outlet of the conduit, so as to compensate for the detected shift, the act of regulating flow of the fluid including:
 calibrating the thermal sensor with a zero flow voltage $V_{ze}$ that represents the voltage output at a zero fluid flow, and a full scale flow voltage $V_{fs}$ that represents the voltage output at a full scale fluid flow, where $V_{ze}$ and $V_{fs}$ are known functions of the pressure and temperature measurements, the thermal sensor output being calibrated at a calibration pressure $P_0$, a calibration ambient temperature $T_0$, and a calibration orientation $Pos_0$, by computing and storing a plurality of calibration values $V_{ze0}, \ldots V_0, \ldots V_{fs0}$ of the output voltage, at corresponding flow rates $0, \ldots, Q_0, \ldots,$ and $Q_{fs0}$, and compensating for the shift in the thermal sensor output caused by thermal siphoning, based on the plurality of stored calibration values, wherein a zero flow voltage $V_{ze1}$ and the full scale voltage $V_{fs1}$ are calculated using the known empirical functions $f_{ze}(P, T_a, \alpha, \mu, M, Pos)$ and $f_{fs}(P, T_a, \alpha, \mu, M, Pos)$, at measured values $P_1$, $T_1$, and $V_1$ of the pressure, temperature, and sensor output voltage respectively, to calculate a thermal sensor voltage output $V_{1'}$ that has been compensated for thermal siphoning; and
 determining a flow rate for which thermal siphoning has been compensated for, by searching the plurality of stored calibration values to find a corresponding flow rate based on the calculated $V_{1'}$.

* * * * *